(12) United States Patent
McGuire

(10) Patent No.: US 6,293,532 B2
(45) Date of Patent: Sep. 25, 2001

(54) FLUID AND ELASTOMER APPARATUS

(75) Inventor: Dennis P. McGuire, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 08/905,190

(22) Filed: Aug. 4, 1997

(51) Int. Cl.$^7$ .................................................. B64C 11/04

(52) U.S. Cl. ...................................... 267/140.13; 267/152

(58) Field of Search ........................ 267/146.13, 146.11, 267/226, 33, 34, 35, 152

(56) References Cited

U.S. PATENT DOCUMENTS

| | | | |
|---|---|---|---|
| 2,067,482 | 1/1937 | Foley | 267/65 |
| 2,818,249 | 12/1957 | Boschi | 267/33 |
| 3,323,764 | * 6/1967 | Johnson | 267/152 |
| 4,236,607 | 12/1980 | Halwes et al. | 188/1 B |
| 4,418,897 | 12/1983 | Härtel et al. | 267/140.1 |
| 4,424,961 | 1/1984 | Takei | 267/64.27 |
| 4,453,638 | 6/1984 | Wallace | 188/282 |
| 4,566,677 | 1/1986 | Le Pierres | 267/140.1 |
| 4,753,421 | 6/1988 | Makibayashi et al. | 267/140.1 |
| 4,753,422 | 6/1988 | Thorn | 267/140.1 |
| 4,809,959 | * 3/1989 | Hourlier | 267/140.13 |
| 4,811,919 | 3/1989 | Jones | 244/54 |
| 4,836,512 | 6/1989 | Lun | 267/140.1 |
| 5,009,403 | 4/1991 | Kato et al. | 267/140.1 |
| 5,065,869 | 11/1991 | Doi et al. | 207/140.1 |
| 5,178,241 | 1/1993 | Aubry | 188/317 |
| 5,230,407 | 7/1993 | Smith et al. | 188/281 |
| 5,249,782 | 10/1993 | Ide et al. | 267/140.14 |
| 5,297,031 | 3/1994 | Gennesseaux | 267/140.14 |
| 5,344,128 | 9/1994 | Kobayashi et al. | 267/140.14 |
| 5,362,035 | 11/1994 | Carter | 267/220 |
| 5,501,434 | 3/1996 | McGuire | 267/140.11 |
| 5,540,549 | 7/1996 | McGuire | 416/140 |
| 5,769,402 | 6/1998 | Ide et al. | 267/140.14 |

FOREIGN PATENT DOCUMENTS

| | | |
|---|---|---|
| 2305 725 | 8/1973 | (DE) . |
| 56066539 | 6/1981 | (EP) . |
| 59222634 | 12/1984 | (EP) . |
| 0 569 158A2 | 11/1993 | (EP) . |
| 2 680 845-A1 | 3/1993 | (FR) . |
| 2041 486 A | 9/1980 | (GB) . |

OTHER PUBLICATIONS

Flower, Wallace C.; Lord Corporation. "Understanding Hydraulic Mounts for Improved Vehicle Noise, Vibration and Ride Qualities"; May 15–17, 1985, LL 2166.

Lord Aerospace. "Fluidlastic Technology. Shock and Motion Control"; 1991, PB 6310.

* cited by examiner

Primary Examiner—Matthew C. Graham
(74) Attorney, Agent, or Firm—Michael M. Gnibus; Randall S. Wayland (57) ABSTRACT

A fluid isolator apparatus (20) for isolating vibration between a vibrating member, such as a helicopter transmission or pylon and another structure, such as a helicopter fuselage. In one aspect, the fluid and elastomer apparatus (20) includes an inner member (24), an outer member (22), and an elastomer element (26) flexibly interconnecting them. First (30) and second (34) operating chambers are interconnected by a passageway (36). Fluid (37) oscillates between the operating chambers (32, 34) through passageway (36). A spring (42) flexibly suspends the piston (40) such that dynamic motion between said inner and outer member (24, 22) displaces piston (40) and spring (42). Preferably the a hollow cavity (28) houses both the piston (40) and a metal coil spring (42). The stiffness of the coil spring (42) may be interchanged to adjust a resonant parameter. Optionally, the piston mass itself or an additional tuning mass (58) mounted on the piston (40) may be used to accomplish tuning. Embodiments describing pistons (40) including rolling diaphragms, elastomer tubeforms, and metal bellows are described.

18 Claims, 7 Drawing Sheets

FLUID AND ELASTOMER APPARATUS

FIELD OF THE INVENTION

This invention relates to devices for controlling dynamic vibration. Specifically, it relates to elastomer and fluid containing apparatus for control of vibration between a member and structure.

BACKGROUND OF THE INVENTION

Fluid and elastomer apparatus, i.e., hydraulic mountings, isolators, and dampers include a fluid which augments the isolation and/or damping characteristics that may be achieved within elastomer mountings alone. This augmentation may take the form of adding additional tuned damping or tuned inertial effects. Fluid mountings are generally described in LORD® Technical Article LL-2166 entitled "Understanding Hydraulic Mounts for Improved Vehicle Noise, Vibration and Ride Qualities" by W. C. Flower. Commonly assigned U.S. Pat. No. 4,811,919 to Jones describes an inertial-type fluid mounting which incorporates a volume compensator.

Other examples of elastomer and fluid apparatus may be found in commonly assigned U.S. Pat. Nos. 5,540,549 and 5,501,434 to McGuire, 5,413,320 to Herbst, 5,374,039 to Schmidt et al., 5,197,692 to Jones et al., and 5,127,607 to McGuire. Fluid isolators, which are a subset of general fluid apparatus, are, in essence, tunable passive devices which use a fluid mass to create inertial forces which are used in conjunction with spring or elastic forces to tune the isolator dynamic characteristics relative to the frequency of vibratory input.

U.S. Pat. No. 4,236,607 to Halwes describes a vibration isolator having a tuning mass including a liquid which generates amplified counter-inertial forces. Notably, Halwes suffers from the problem that it cannot adequately compensate for temperature differentials which cause expansion of the fluid therein. Further, it may be difficult to obtain enough fluid mass in the straight-through inertia track design as described in Halwes. Further, there is a lack of tuneability in Halwes. Furthermore, the pockets formed in elastomer to receive lugs 34 in Halwes may act as stress concentrators which may adversely effect rubber fatigue. Simply, it may be advantageous to have a larger surface area to reduce rubber stresses within the part. Optionally, it may be desirable to lower the length of the isolator.

SUMMARY OF THE INVENTION

Therefore, in light of the advantages and drawbacks of the prior art, the present invention is an apparatus, such as a fluid isolator, for attaching between a vibrating member and a structure. Preferably, the apparatus is an isolator which utilizes "tuned inertia" effects to cancel vibration. In one aspect of the invention, the fluid apparatus comprises an inner member, an outer member, and an elastomer element flexibly interconnecting them, a first operating chamber including a first moveable wall portion defined by the elastomer element, and a second operating chamber including a second moveable wall portion defined by an axially moveable piston. A passageway interconnects the first and second operating chambers, and a fluid contained therein oscillates in response to relative movements between the inner and outer members. A spring flexibly suspends the axially moveable piston such that dynamic motion between said inner and outer member displaces said piston and spring.

According to another preferable aspect, the inner member includes a hollow cavity which houses both the piston and spring. The piston is statically displaceable in response to temperature buildup within said isolator or dynamic perturbations due to relative movement of fluid between the operating chambers. In accordance with another aspect, the stiffness of said spring is changed to adjust a resonant parameter within said isolator. Optionally, the piston mass itself or an additional tuning mass mounted on the piston may be adjusted to accomplish tuning of a resonant parameter of the apparatus.

In a preferred embodiment, a rolling diaphragm is operative with said piston and dynamically displaceable in response to relative movement between said inner and outer members. In a space saving aspect, the passageway is an inertia track having a "tuned inertia" and includes a helical shape. The passageway assembly preferably seats against a peripheral seal formed on the rolling diaphragm to position and seal same. Alternatively, the piston may be suspended from an elastomer member or part of a metal bellows.

It is an advantage in one aspect of the present invention that a separate volume compensator is not required.

It is an advantage in one aspect of the present invention that a the effective tuned mass may be easily tuned without rebonding.

It is an advantage in one aspect of the present invention that a compact configuration may be obtained.

It is an advantage in another aspect of the present invention that a the effective volume stiffness of one of the chambers may be easily tuned without rebonding.

The above-mentioned and further aspects, advantages and characteristics of the present invention will become apparent from the accompanying descriptions of the preferred embodiments, claims, and attached drawings which follow.

BRIEF DESCRIPTION OF THE DRAWINGS

The accompanying drawings which form a part of the specification, illustrate several key embodiments of the present invention. The drawings and description together, serve to fully explain the invention. In the drawings.

DETAILED DESCRIPTION OF THE INVENTION

Figure 1:
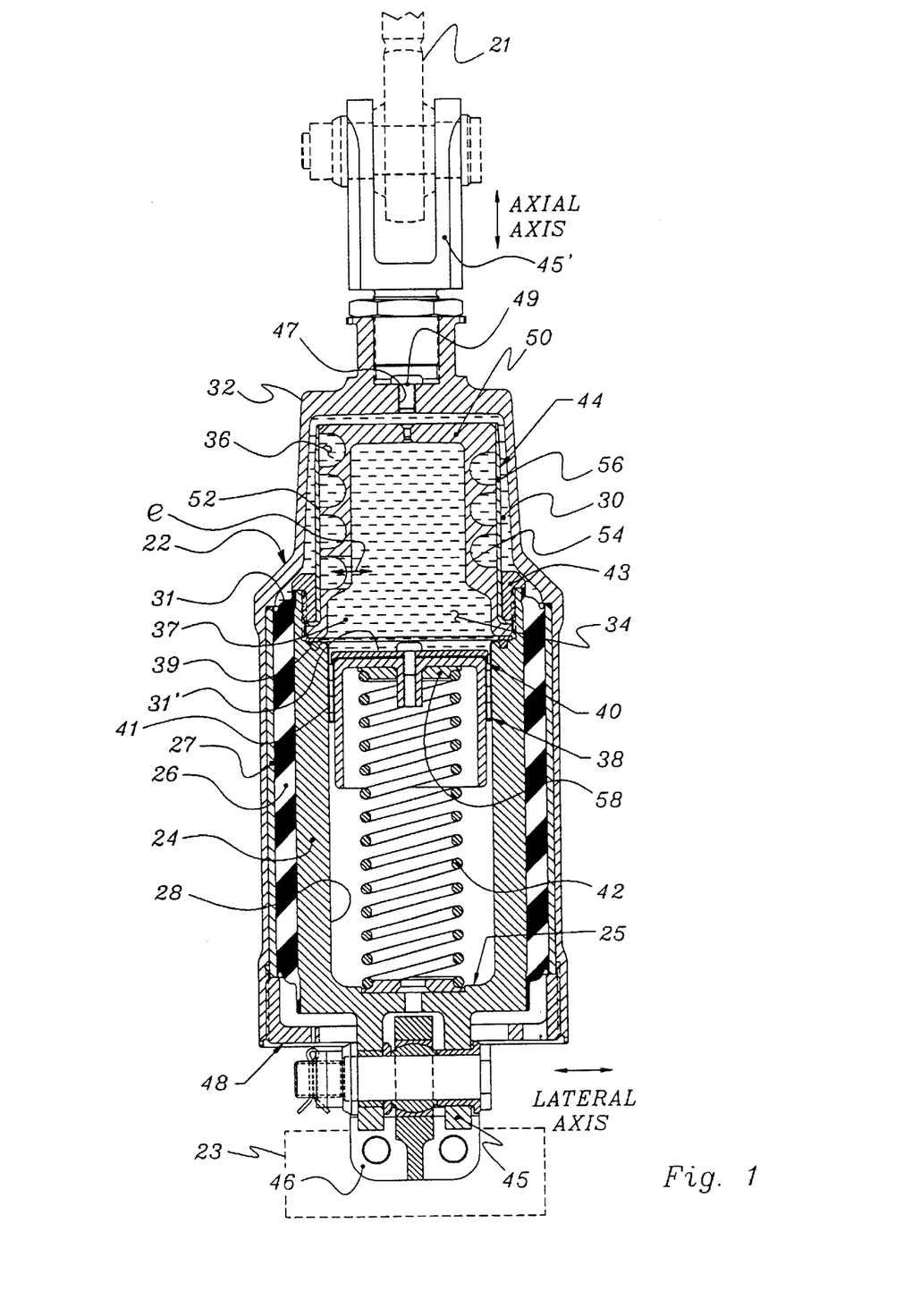
FIG. 1 is a partial cross-sectioned side view of a first embodiment of the present invention fluid apparatus.
Figure 2:
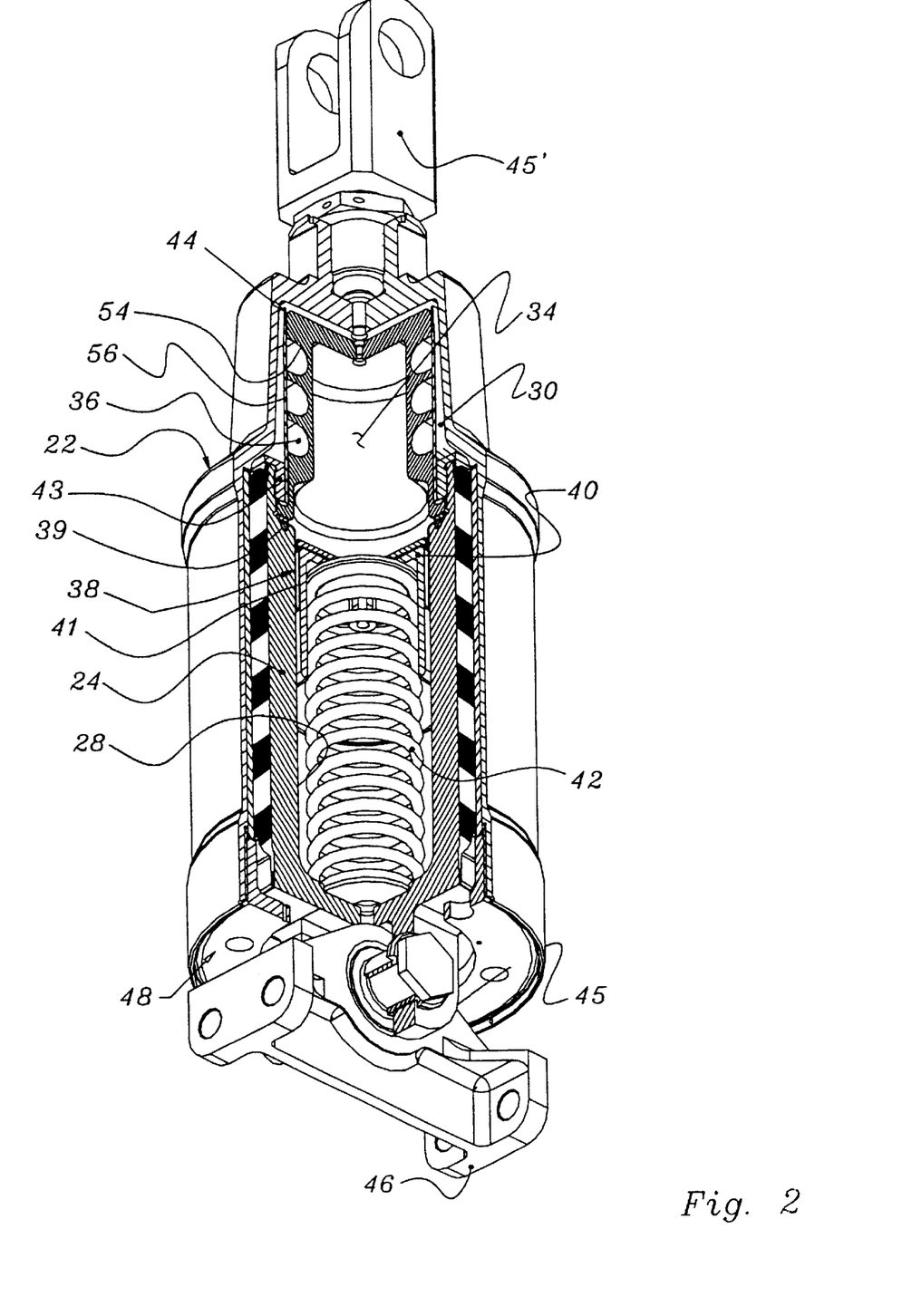
FIG. 2 is an partially cross-sectioned isometric view of the fluid apparatus of FIG. 1.

Referring now to the Drawings where like numerals denote like elements, in FIG. 1 and 2, shown generally at 20, is a first embodiment of the fluid isolator. The fluid isolator 20 is useful for controlling, and preferably minimizing, dynamic vibration (motion and force) transmitted between a vibrating member 21, such as transmission, pylon, or component thereof and a structure 23, such as an aircraft fuselage or component thereof. The fluid and elastomer apparatus 20 comprises an elongate inner member 24, which preferably includes a cylindrical shape and a hollow cavity 28 formed therein. The inner member 24 attaches to a pivot element 46 by way of spherical joint 29 or other linkage 59 (FIG. 3) which, in turn, interconnects to a helicopter fuselage, or other like structure. An elongated hollow outer member 22 encircles and surrounds inner member 24 and attaches, for example, to a helicopter transmission, pylon, or component or other vibrating member by a clevis member 45' which threadedly attaches into outer member 22.

A preferably annular tubeform elastomer element 26 flexibly interconnects the inner member 24 relative to said outer member 22. The elastomer material may be natural rubber, blends of natural and synthetic rubber, or silicone elastomer, or any other suitable flexible material. For isolator applications, the elastomer is preferably lightly damped. Preferably, the elastomer 26 is bonded to the outer surface of inner member 24 and to an inner periphery of a thin sleeve 27. Housing 32, thin sleeve 27, and bumper 48 comprise the outer member 22.

A first operating chamber 30 located at a first end of the apparatus 20 includes a first moveable wall portion. 31 defined by the axial annular end of elastomer element 26. The wall 31 moves in response to relative movements of the inner member and outer member 22, but also as a result of fluid 37 resonating through chamber. A second operating chamber 34 includes a second moveable wall portion 31' defined by an axially moving piston 40. The piston area of the piston 40 is usually less than that of the first chamber 30.

A passageway 36, which is preferably an inertia track, interconnects the first and second operating chambers 32, 34. By the term "inertia track", what is referred to is any passageway that has a "tuned inertia", i.e., a tuned fluid mass which resonates at a selected frequency within the passageway 36. The length and area of the inertia track is selected, amongst other parameters to tune the resonant frequency of the fluid 37.

Preferably, the inertia track includes a helical shape, such that an appropriate length may be achieved in a fairly compact device. A suitable fluid 37 is contained within the first and second operating chambers 32, 34, and the passageway 36. Preferable fluids include silicone oils and perfluorinated fluids. In the case of an isolator, preferable fluids exhibit viscosities on the order of about 1–10 centistokes. Dampers would include fluids having higher viscosities, say 1,00–10,000 centistokes. Fluid fill takes place through fill passage 47 which is then plugged with fill plug 49.

A spring 42 flexibly suspends the piston 40, such that dynamic motion between said inner and outer member 24, 22 displaces said piston 40 and compresses spring 42 in an axial direction. The preferable spring 42 is a coil spring having a static stiffness of about 50–200 lb./in. and have a sufficient length to accommodate static axial displacements in response to temperature buildup as well as dynamic movements, and to provide the appropriate level of prepressure. Generally, 50 psi prepressure or more is desired. The axial stiffness of the spring 42 is selected to tune or control a resonant parameter within apparatus 20.

In a novel aspect, the hollow cavity 28 within inner member houses the piston 40 and spring 42 therewithin. Spring 42 preferably underlies piston 40 and is precompressed between an end portion 25 of inner member 24 and the piston 40. Precompressing spring 42 pressurizes the fluid within the operating chambers thereby minimizing cavitation of the fluid when axially pulling the apparatus 20.

In a preferred embodiment, a DACRON fabric and nitrile elastomer rolling diaphragm 38 overlies a portion of, and is operative with, the piston 40. The piston 40 and, thus, diaphragm 38 are dynamically displaceable in response to relative movement between the inner and outer members 24, 22. The diaphragm 38 includes a sidewall portion 41 which is doubled over between sides of the piston 40 and walls of hollow cavity 28. Attached to the sidewall portion 41 is a peripheral seal 39. This seal 39 is clamped between a ledge formed on the inner member 24 and a flared end of the passageway assembly 44. Preferably, the passageway assembly 44 is secured in place with lock ring 43 which threads into an axial end of the inner member 24. Wrench slots or the like may be included on ring 43.

The passageway assembly 44 includes a hollow body portion 50 having an outer peripheral surface 52 into which a helical groove 54 is machined, and an outer sleeve 56 which is slipped over the peripheral surface 52 to form the passageway 36. The passageway lower entrance/exits is shown at arrow e. The upper entrance/exit occurs wherever the groove 54 breaks out of the top of body 50.

On the other end of inner member 24 is a clevis 45 which interconnects to a pivot element 46 which allows pivoting of the inner member 24 about a lateral axis. The bumper 48 threads into an end of housing 32 and secures sleeve 27 in place. Appropriate seals or adhesive are provided to seal against escape of fluid 37. Bumper 48 also functions to limit axial movement of the inner member 24, thus providing an axial snubbing feature in the extension direction.

Figure 3A:
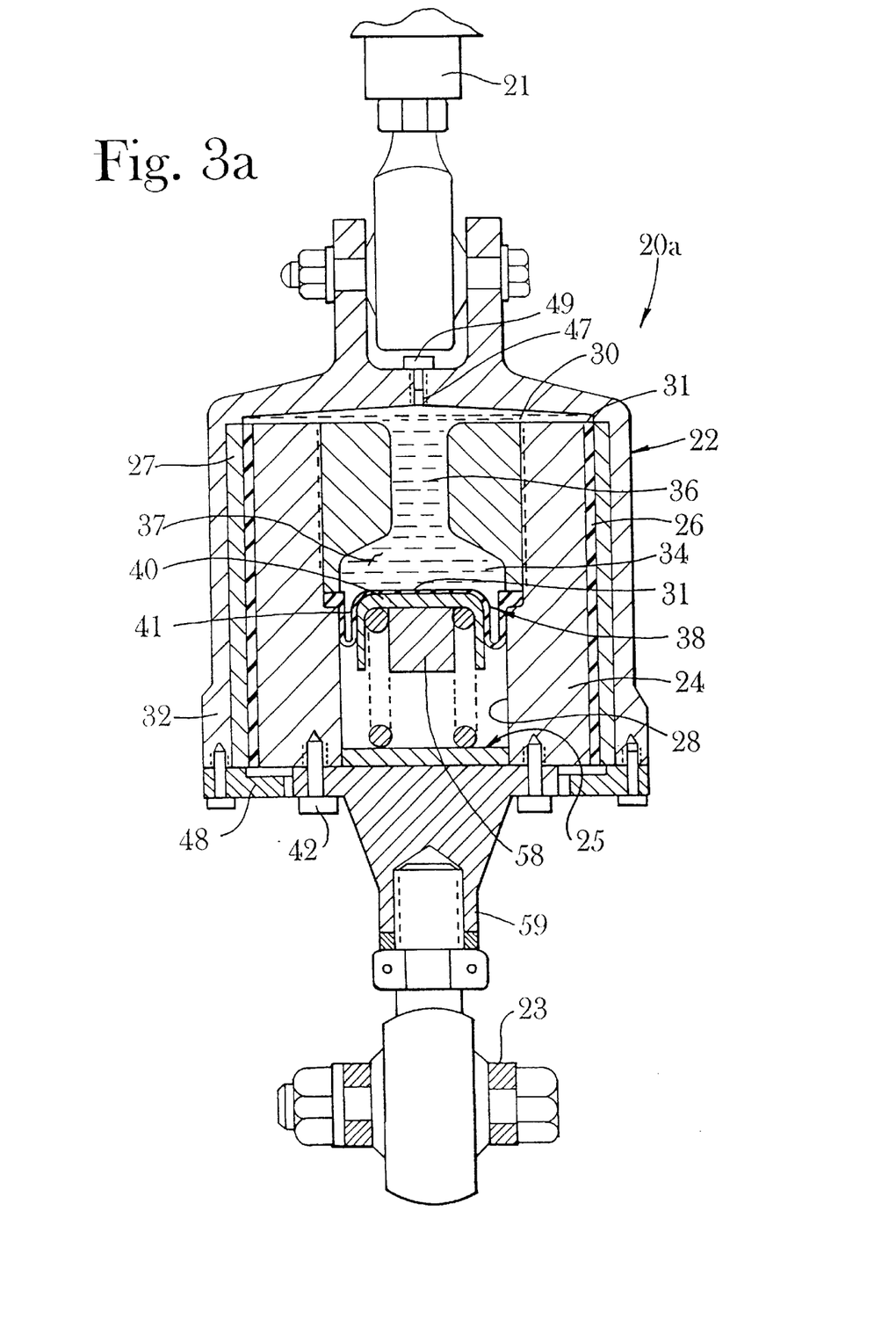
FIG. 3a is an cross-sectioned side view of an alternate embodiment of fluid apparatus.
Figure 4:
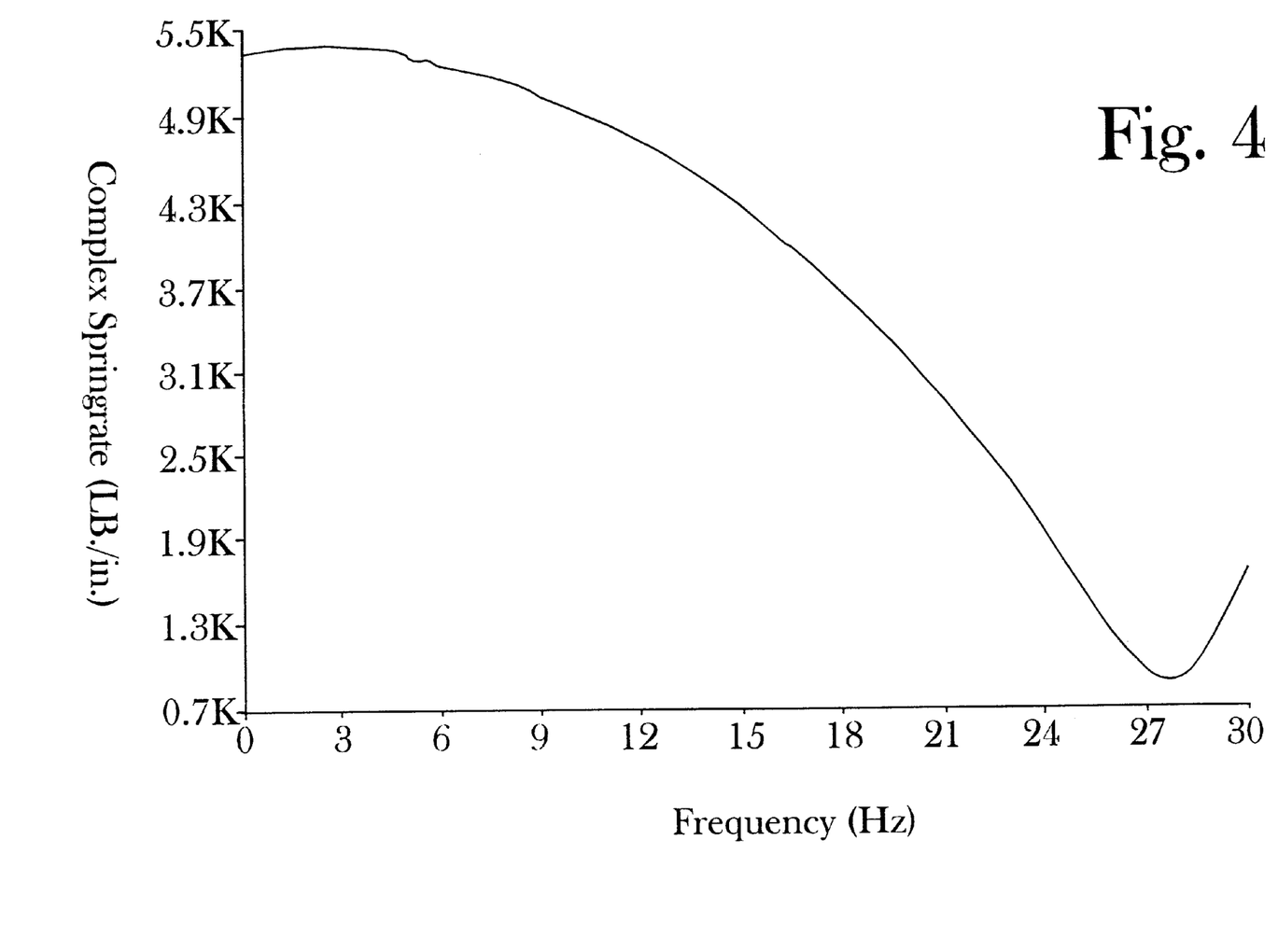
FIG. 4 is an performance plot for the apparatus.

To accomplish tuning, the mass of the piston 40 may be adjusted to provide an additional tuning mass. Optionally, as illustrated in FIG. 3a, additional tuning mass 58 may be mounted on an underside of the piston 40 to accomplish tuning of a resonant parameter of the apparatus 20 (ex. the tuned notch frequency as is illustrated in FIG. 4). The additional mass 58 may be included within the spring retainer (see FIG. 1) or elsewhere on the piston 40.

FIG. 3a illustrates another embodiment of fluid and elastomer apparatus 20a. This embodiment differs from the previous embodiment in that the passageway 36 extends axially through the inner member 24. Further, a linkage 59 bolts to the inner member rather than an integral and one-piece clevis. Either end includes spherical rod ends for attaching to the respective members 21, 23. This embodiment has the distinct advantage that the spring 42 and mass 58 may be adjusted without having to refill the apparatus 20a.

Figure 3B:
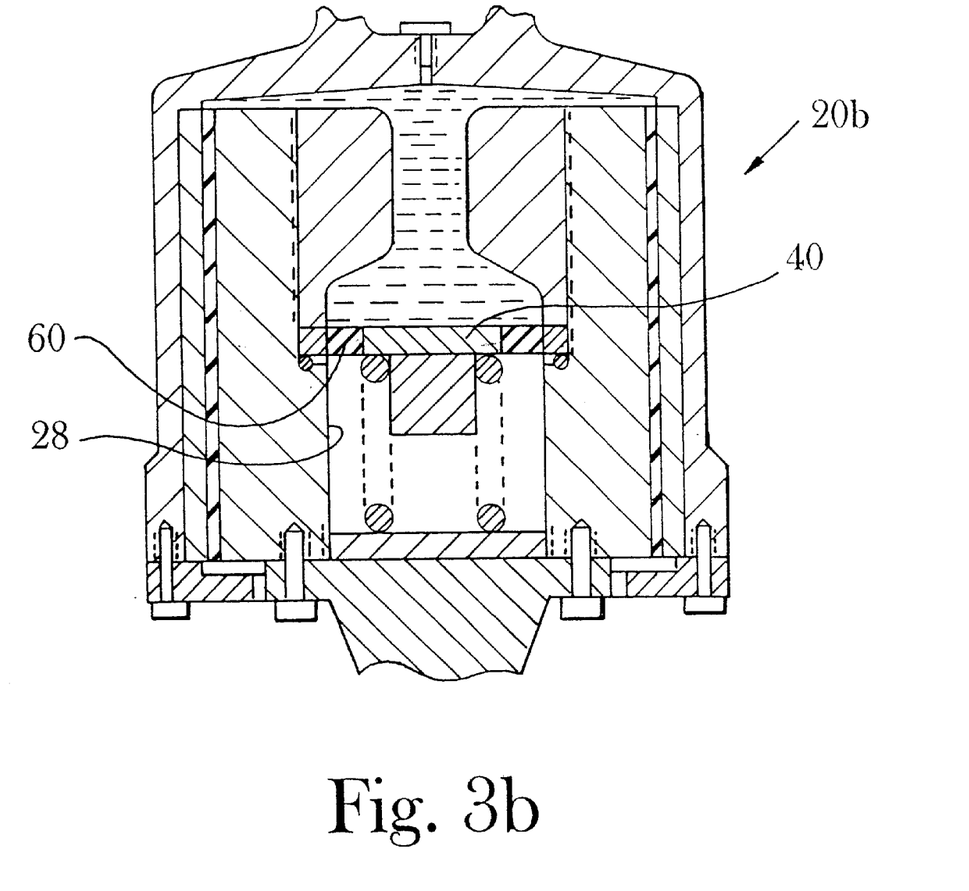
FIG. 3b is an cross-sectioned side view of a portion of another alternate embodiment of fluid apparatus.

FIG. 3b illustrates another embodiment of fluid and elastomer apparatus 20b. This embodiment differs from the previous embodiment in that the piston 40 includes a bonded elastomer portion 60 bonded between a radial surface of the piston and the inner surface of hollow 28.

Figure 3C:
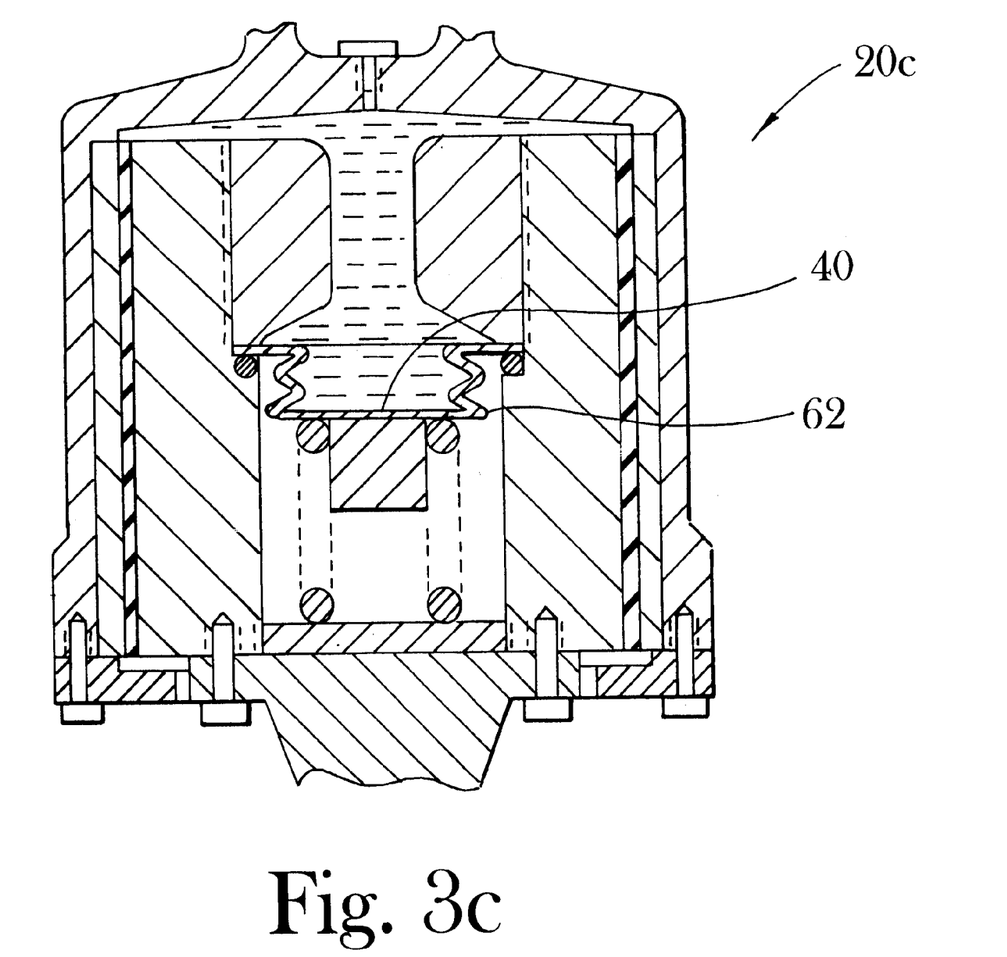
FIG. 3c is an cross-sectioned side view of a portion of yet another alternate embodiment of fluid apparatus.

FIG. 3c illustrates yet another embodiment of fluid and elastomer apparatus 20c. This embodiment differs from the previous embodiment in that the piston 40 comprises a portion of a metal bellows 62. The metal bellows 62 includes a flexible wall portion 63 which can flex axially to allow axial motion of the piston 40.

EXAMPLE

Figure 3D:
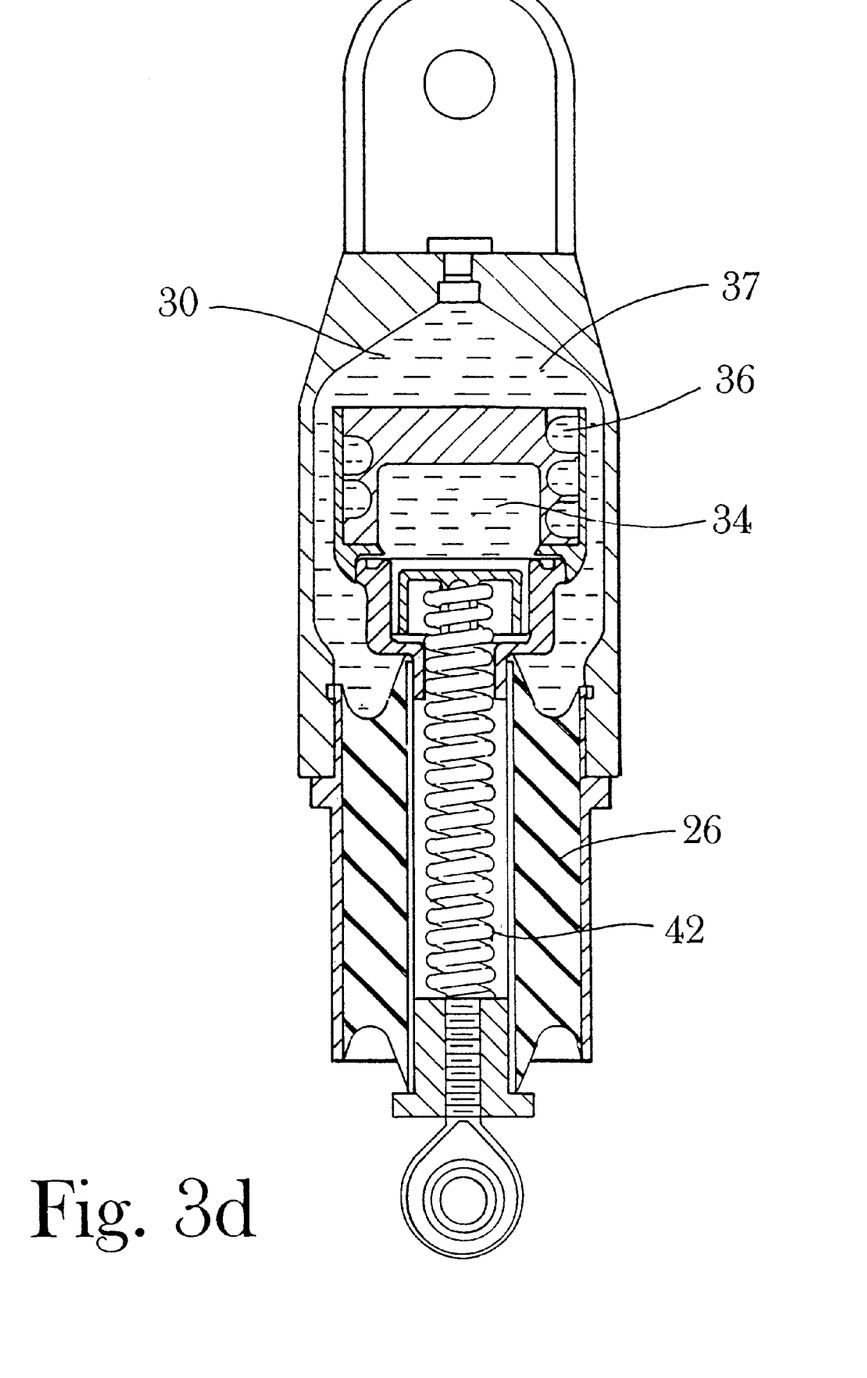
FIG. 3d is an cross-sectioned side view of another alternate embodiment of fluid apparatus that was tested.

The following parameters are representative of a test isolator apparatus of FIG. 3d in accordance with the present invention which was manufactured and tested in the assignee's laboratory. The values herein are exemplary, and not to be considered limiting.

Kaxial dynamic of elastomer 26 = 5,500 lb./in.
Fluid 37 = Perfluorinated polyether
Elastomer 26 = Natural rubber and polybutadiene blend
Axial stiffness of coil spring 42 = 70–150 lb./in.
Length of coil 42 = about 5.0 in. installed
Prepressure in chambers 30, 34 = about 50 psi
Length of inertia track 36 = 3.0 in.
Area of inertia track 36 = 0.10 in.$^2$
Volume Stiffness (upper chamber 30) = about 2,000 psi/in.$^3$
Piston Area (upper chamber 30) = 2.7 in.$^2$
Piston Area (lower chamber 34) = 1.5 in.$^2$ FIG. 4 illustrates an experimental performance curve for the mockup of the present invention shown in FIG. 3d that was actually tested. Shown is a frequency sweep of dynamic complex stiffness K* (from about 700–5,500 lb. /in.) as a function of frequency (from about 0–30 Hz). The sweep was done at+/−0.005 in. within a dynamic test machine.

While various embodiments, including the preferred embodiment of the present invention has been described in detail, various modifications, alterations, changes, and adaptations to the afore-mentioned may be made without departing from the spirit and scope of the present invention defined in the appended claims. It is intended that all such modifications, alterations and changes be considered part of the present invention.

What is claimed is:

1. A tuned fluid isolator, comprising:

(a) an inner member, (b) an outer member, (c) an elastomer element flexibly interconnecting said inner member relative to said outer member, (d) a first operating chamber including a first moveable wall portion defined by said elastomer element, (e) a second operating chamber including a second moveable wall portion defined by an axially moving piston, (f) a passageway interconnecting said first and second operating chambers, (g) a fluid contained within said first and second operating chambers, and said passageway, (h) a spring flexibly suspending said piston such that dynamic motion between said inner and outer member displaces said piston; and (i) a rolling diaphragm operative with said piston and dynamically displaceable in response to relative movement between said inner and outer members.

2. A fluid isolator of claim 1 wherein said inner member includes a hollow cavity housing said piston and said spring.

3. A fluid isolator of claim 1 wherein said inner member interconnects to a pivot element which allows pivoting of said inner member about a lateral axis.

4. A fluid isolator of claim 1 wherein said piston is statically displaceable in response to temperature buildup within said isolator.

5. A fluid isolator of claim 1 wherein an additional tuning mass is mounted on said piston to accomplish tuning of a resonant parameter of said apparatus.

6. A fluid isolator of claim 1 wherein said piston is interconnected to a wall of said inner member by elastomer.

7. A fluid isolator of claim 1 wherein said piston is included in a metal bellows.

8. A fluid and elastomer apparatus, comprising:

(a) an inner member, (b) an outer member, (c) an elastomer element flexibly interconnecting said inner member relative to said outer member, (d) a first operating chamber including a first moveable wall portion defined by said elastomer element, (e) a second operating chamber including a second moveable wall portion defined by an axially moving piston, (f) a passageway interconnecting said first and second operating chambers, (g) a fluid contained within said first and second operating chambers, and said passageway, (h) a spring flexibly suspending said piston such that dynamic motion between said inner and outer member displaces said piston; and (i) a bumper to limit axial movement of said inner member.

9. A tuned fluid isolator comprising:

(a) an inner member, (b) an outer member, (c) an elastomer element flexibly interconnecting said inner member relative to said outer member, (d) a first operating chamber including a first moveable wall portion defined by said elastomer element, (e) a second operating chamber including a second moveable wall portion defined by an axially moving piston, (f) a passageway interconnecting said first and second operating chambers, said passageway defining an inertia track having a tuned inertia, (g) a fluid contained within said first and second operating chambers, and said passageway, and (h) a spring flexibly suspending said piston such that relative motion between said inner and outer member displaces said piston.

10. A fluid isolator of claim 9 wherein said inertia track includes a helical shape.

11. A fluid isolator of claim 10 wherein said inertia track is included within an inertia track assembly which seats against a peripheral seal formed on said rolling diaphragm.

12. A fluid isolator of claim 11 wherein said inertia track assembly is threadedly assembled to an axial end of said inner member.

13. A fluid isolator of claim 9 wherein said inertia track is included within an inertia track assembly which further includes a hollow body portion having an outer peripheral surface into which a helical groove is machined, and a sleeve which is received over said peripheral surface.

14. A tuned fluid isolator, comprising:

(a) an inner member;

(b) an outer member;

(c) an elastomer element flexibly interconnecting said inner member relative to said outer member;

(d) a first operating chamber including a first moveable wall portion defined by said elastomer element;

(e) a second operating chamber including a second moveable wall portion defined by an axially moving piston;

(f) a passageway interconnecting said first and second operating chambers;

(g) a fluid contained within said first and second operating chambers, and said passageway;

(h) a spring flexibly suspending said piston such that dynamic motion between said inner and outer member displaces said piston; and (i) a rolling diaphragm operative with said piston and dynamically displaceable in response to relative movement between said inner and outer members;

(j) wherein said tuned isolator uses tuned inertia effects to cancel input vibration.

15. A tuned fluid isolator comprising:
(a) an inner member,
(b) an outer member,
(c) an elastomer element flexibly interconnecting said inner member relative to said outer member,
(d) a first operating chamber including a first moveable wall portion defined by said elastomer element,
(e) a second operating chamber including a second moveable wall portion defined by an axially moving piston,
(f) a passageway interconnecting said first and second operating chambers,
(g) a fluid contained within said first and second operating chambers, and said passaegeway, and
(h) a spring flexibly suspending said piston such that dynamic motion between said inner and outer member displaces said piston; and
wherein a stiffness of said spring is selected to control a resonant parameter within said tuned fluid isolator.

16. A tuned fluid isolator, comprising:
(a) an inner member,
(b) an outer member,
(c) an elastomer element flexibly interconnecting said inner member relative to said outer member,
(d) a first operating chamber including a first moveable wall portion defined by said elastomer element,
(e) a second operating chamber including a second moveable wall portion defined by an axially moving piston,
(f) a passageway interconnecting said first and second operating chambers,
(g) a fluid contained within said first and second operating chambers, and said passageway,
(h) a spring flexibly suspending said piston such that dynamic motion between said inner and outer member displaces said piston;
(i) a rolling diaphragm operative with said piston and dynamically displaceable in response to relative movement between said inner and outer members; and
(j) an additional tuning mass mounted on said piston to accomplish tuning of a resonant parameter of said apparatus.

17. A tuned fluid isolator, comprising:
(a) an inner member,
(b) an outer member encircling said inner member,
(c) an elastomer element flexibly suspending said inner member relative to said outer member,
(d) a first operating chamber including a first wall portion defined by said elastomer element,
(e) a second operating chamber including a second wall portion defined by an axially moving piston,
(f) a passageway interconnecting said first and second operating chambers,
(g) a fluid contained within said first and second operating chambers, and said passageway,
(h) a spring flexibly suspending said piston such that dynamic motion between said inner and outer member displaces said piston, and
(i) a tuning mass mounted on said piston to accomplish tuning of a resonant parameter of said tuned fluid isolator.

18. A tuned fluid isolator, comprising:
(a) an inner member including a hollow cavity,
(b) an outer member encircling said inner member,
(c) an annular elastomer element flexibly suspending said inner member relative to said outer member,
(d) a first operating chamber having a first moveable wall portion defined by an end portion of said annular elastomer element,
(e) a second operating chamber including a second moveable wall portion,
(f) a passageway interconnecting said first and second operating chambers,
(g) a fluid contained within said first and second operating chambers, and said passageway,
(h) a rigid axially moveable wall portion within said hollow cavity whose mass cooperates with a mass of said fluid to effect a resonant parameter of said tuned fluid isolator, and
(i) spring means within said hollow cavity for flexibly suspending said rigid axially moveable portion such that dynamic motion between said inner and outer member dynamically displaces said rigid axially moveable wall portion in an axial direction.

* * * * *